UNITED STATES PATENT OFFICE.

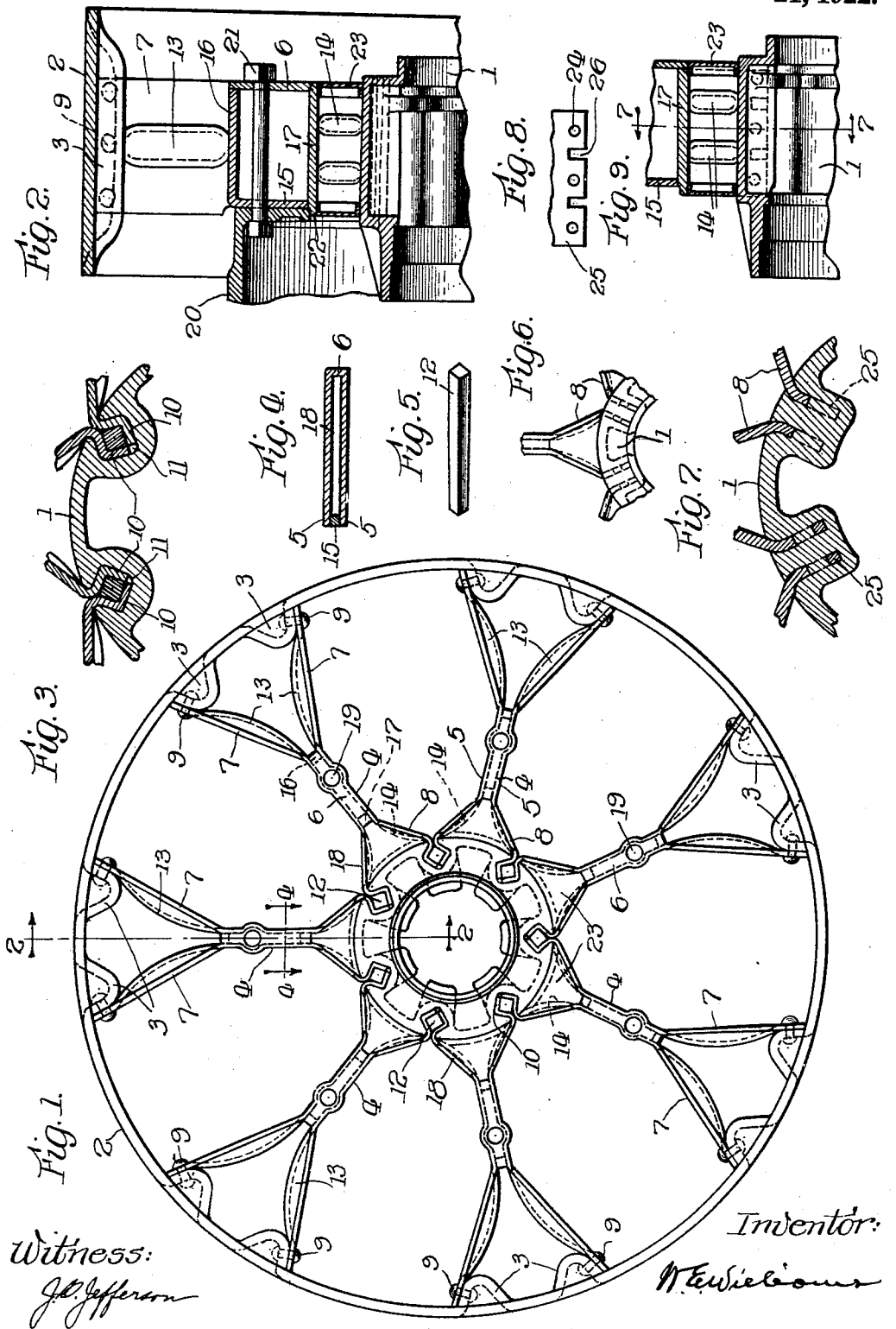

WILLIAM ERASTUS WILLIAMS, OF CHICAGO, ILLINOIS.

FABRICATED WHEEL FOR AUTOMOBILES.

1,410,045.  Specification of Letters Patent.  Patented Mar. 21, 1922.

Application filed October 2, 1919. Serial No. 328,053.

*To all whom it may concern:*

Be it known that I, WILLIAM ERASTUS WILLIAMS, a citizen of the United States, a resident of Chicago, in the county of Cook and State of Illinois, have invented a new and useful Improvement in Fabricated Wheels for Automobiles, of which the following is a specification.

The object of my invention is to provide a wheel principally of rolled steel but having a small proportion of cast steel, the combination of the two kinds of steel being such as to give a wheel lighter, stronger, and less expensive than ordinary wheels of either rolled or cast metal alone.

The invention is set forth in the claims.

Reference will be had to the accompanying drawing in which Figure 1 is a front elevation of the wheel.

Figure 2 is a transverse sectional elevation.

Figure 3 is a fragmentary section of the hub, the plane of section being parallel to the general plane of the wheel.

Figure 4 is a transverse section of one of the spokes on line 4—4 of Figure 1.

Figure 5 is a perspective view of a key used in locking the spokes into the hub.

Figure 6 is a front view and Figure 7 a section on the line 7—7, Figure 9, both views relating to the same modification.

Figure 8 is a detail of the end of one of the spokes used in the modified form shown in Figures 6 and 7.

Figure 9 is an axial section of the hub of the modification shown in Figs. 6, 7, 8.

In the drawing 1 indicates the hub of the wheel, here drawn to correspond with the requirements of a heavy truck wheel as relates to the inside of the hub barrel.

2 indicates the rim of a wheel here shown as having a series of depressions formed by pressing the medial portion of the rim inward, at points where the spokes are to be attached, to form transverse ribs 3.

This wheel is intended to be used with what are known as "pressed on" rubber tires and therefore the depressions 3 are covered up by the metal bases of the rubber tire. However, other types of tires may be used on this wheel or the rim 2 may be without a tire of any kind.

The spokes 4 are made from flat steel bars medially slit at each end and bent along medial horizontal lines to bring the margins 5 into registry and form at 6 the front face of the complete spoke. The parts 7, 8, formed by slitting the outer and inner end portions, respectively, are bent divergently, as shown in Fig. 1, the parts 7 abutting the rim and secured to it or to the ribs 3 by rivets 9. The parts 8 are transversely corrugated and seated in transverse, peripheral recesses 11 in the hub and rigidly secured therein by tapered, tightly driven keys 12. The parts 7 and 8 have central, longitudinal stiffening ribs 13, 14, respectively, formed by pressing the metal out of its original plane.

In the main body of the spoke 4 as shown by the cross section Figure 4, I close in the back side by means of an insert block 15 which is welded into this space between the ends 5. Blocks 16 and 17 are welded across the walls of this body of the spoke, where the end pieces 7 and 8 separate, in order to make a closed cavity 18 in the body of the spoke. This body of the spoke is expanded for the bolt hole 19 for a bolt 21, which secures the brake drum 20. This brake drum 20 has a flange which rests on shoulders 22 in the edges of the body of the spokes in order to hold the drum concentric with the wheel.

The cavities between the spread ends 8 of the spokes are filled in by small plates 23, but these spaces may be left open if desired.

In place of keying the spokes into the hub as shown in the Figures 1 to 5 inclusive, I may cast them in as shown in Figures 6 to 9 inclusive and in this case I prepare in the inner ends of the spokes 5, the small holes 24 and the slots 25, which permit the molten metal to run through and form as it were integral bodies embracing the spoke ends in a very rigid manner, as is indicated by Figure 7 wherein the inner ends of the spokes are indicated by 25.

In a wheel of this type, wherein there are severe shocks in torsional directions, it is necessary not only to secure the spokes into the wheel in a manner to stand the direct loads on the axle and the skidding thrusts, but also to take the torsional strains of braking the wheel in stopping the car and the torsional strains in driving the car.

The split ends of my spokes in the bracing positions as described make secure fastenings that not only take up the load strains of the wheel but also the torsional strains, and do this with an efficient use of metal which permits a very light wheel to be constructed and at the same time one that is easily and cheaply made.

What I claim is:—

1. In a metal wheel of the class described, a rim having depressions extending transversely of the rim and inwardly in a manner to form a series of ribs across the rim for stiffening purposes and for facility in securing spokes thereto.

2. In a metal wheel, a series of spokes made of flat sheets of metal cut asunder at each end and the body of the sheet folded upon itself and with the split ends spread apart at each end forming double branches for each stroke, each branch of the spoke ends on the hub end secured to the hub and each branch on the rim side secured to the rim.

3. In a fabricated wheel, the spokes made of flat metal joined together between the hub and the rim with their ends spread asunder and connected to the hub and to the rim and the said ends embossed with stiffening ribs.

4. In a wheel of the class described, a rim having transversely embossed projections extending inward to stiffen the rim, with spoke ends extending transversely across the embossed ribs of the rim and connected thereto.

5. In a fabricated wheel, the combination with a hub provided with a series of peripheral recesses laterally undercut on two opposite sides, of pairs of spokes having their ends entered in the recesses, respectively, and locking devices forcing the ends of each pair oppositely firmly against the undercut walls of the corresponding recess.

6. A fabricated wheel having a series of spokes made of metal with their ends flattened and bent in angular form, with a hub provided with a series of angular shaped slots or grooves adapted to receive the spoke ends and a series of keys locking the spoke ends into apertures in the hub.

7. In a metal wheel, a series of flat spokes connected, in the middle region between the rim and hub, to form pairs of spokes which diverge from said region, each divergent spoke meeting at the hub a spoke of the next pair, the ends of the spokes so meeting at the hub being rigidly locked to the hub.

8. In a metal wheel, the combination with a hub of a series of broad flat spokes arranged edgewise with respect to the plane of the wheel, united in pairs in the middle region of their bodies and provided in said region with means for holding other parts against their edges, the inner and outer end portions of the jointed spokes diverging to meet the rim and hub, respectively, at widely separated points.

9. In a wheel of the class described, the combination with a hub having peripheral laterally undercut spoke receiving recesses aproximately parallel to the hub's axis, of broad flat spokes arranged edgewise with respect to the plane of the wheel and a pair of spokes entering each of said recesses, the spokes of each such pair engaging the undercut walls, respectively, of the corresponding recess, and rigidly held in place by wedging devices.

10. In a wheel of the class described, a series of spokes made of flat sheets of metal extending with their surfaces transversely of the rim and joined at the middle portion of the spokes and with spread ends, and the spread ends joined to the rim at one end of the spokes and to the hub at the other end, with the cavities between the spread ends of the spokes on the hub end enclosed, giving the appearance of a solid area and shutting out foreign matter.

11. In a wheel of the class described, the combination with a hub and a rim, of broad flat spokes arranged in pairs with their middle regions connected but spaced to receive intermediate fastenings for securing other devices alongside the spoke edges, the outer ends of the spokes of each pair diverging from said region toward the rim and the inner ends similarly diverging and meeting the hub, whereby the spokes of each pair practically form at their middles a broad double member braced by the pairs of diverging end portions.

Signed at Chicago, in the county of Cook and State of Illinois, this twenty-second day of September, 1919.

WILLIAM ERASTUS WILLIAMS.

Witnesses:
　J. B. JEFFERSON,
　B. J. BERNHARD.